US008562498B2

(12) United States Patent
Mossberg

(10) Patent No.: US 8,562,498 B2
(45) Date of Patent: Oct. 22, 2013

(54) PRESS ROLL FOR WASHING AND/OR DEWATERING PULP, AND A METHOD FOR MANUFACTURING OR REPAIRING SUCH A PRESS ROLL

(75) Inventor: Jan Mossberg, Härnösand (SE)

(73) Assignee: Metso Paper, Inc. (FI)

( * ) Notice: Subject to any disclaimer, the term of this patent is extended or adjusted under 35 U.S.C. 154(b) by 704 days.

(21) Appl. No.: 12/441,967

(22) PCT Filed: Nov. 13, 2007

(86) PCT No.: PCT/SE2007/050840
§ 371 (c)(1),
(2), (4) Date: Mar. 19, 2009

(87) PCT Pub. No.: WO2008/063122
PCT Pub. Date: May 29, 2008

(65) Prior Publication Data

US 2010/0048371 A1 Feb. 25, 2010

(30) Foreign Application Priority Data

Nov. 23, 2006 (SE) ....................................... 0602515

(51) Int. Cl.
*C02F 11/12* (2006.01)

(52) U.S. Cl.
USPC .................................. 492/20; 492/32; 492/30

(58) Field of Classification Search
USPC ........................ 492/20, 26, 28, 32, 48, 38, 40
See application file for complete search history.

(56) References Cited

U.S. PATENT DOCUMENTS

| | | | | |
|---|---|---|---|---|
| 354,955 | A * | 12/1886 | Valk | 19/63 |
| 555,719 | A * | 3/1896 | Winn | 451/497 |
| 901,873 | A * | 10/1908 | Brubaker | 492/38 |
| 984,618 | A * | 2/1911 | Troutman | 492/26 |
| 1,154,775 | A * | 9/1915 | Johnson | 383/66 |
| 1,155,304 | A * | 9/1915 | Dunham | 404/122 |

(Continued)

FOREIGN PATENT DOCUMENTS

| | | |
|---|---|---|
| GB | 291148 | 5/1928 |
| WO | 2005047595 A1 | 5/2005 |
| WO | 2006/068569 | 6/2006 |
| WO | 2007004968 A1 | 1/2007 |

OTHER PUBLICATIONS

International Search Report, PCT/SE2007/050840.

(Continued)

*Primary Examiner* — David Bryant
*Assistant Examiner* — Jason L Vaughan
(74) *Attorney, Agent, or Firm* — Lerner, David, Littenberg, Krumholz & Mentlik, LLP

(57) ABSTRACT

Press rolls for washing or dewatering pulp are disclosed including a core, a mantle section attached around the core, at least one perforated roll plate extending around the circumference of the press roll, and including a plurality of mounting openings disposed between the end edges of the perforated roll plate and distributed around the entire circumference of the press roll, and a plurality of fixing pins corresponding to the mounting openings, each being anchored to the mantle section and surrounded by the corresponding plurality of mounting openings whereby movement of the perforated roll plate relative to the mantle section in a circumferential direction of the press roll is prevented.

20 Claims, 4 Drawing Sheets

(56) References Cited

U.S. PATENT DOCUMENTS

| | | | | | |
|---|---|---|---|---|---|
| 1,685,084 | A | | 9/1928 | Hoyt | |
| 1,741,800 | A | * | 12/1929 | Washburn | 242/118.6 |
| 1,752,005 | A | * | 3/1930 | Johnston | 492/26 |
| 1,873,041 | A | * | 8/1932 | Robinson | 425/194 |
| 2,424,167 | A | * | 7/1947 | Hillquist | 451/500 |
| 2,437,050 | A | * | 3/1948 | Schulz | 492/25 |
| 2,762,111 | A | * | 9/1956 | Morgan | 492/43 |
| 3,180,007 | A | * | 4/1965 | Gartz | 492/38 |
| 3,430,560 | A | * | 3/1969 | Nettleman | 101/407.1 |
| 3,526,939 | A | * | 9/1970 | Nikkanen | 29/895.212 |
| 3,590,453 | A | * | 7/1971 | Bryand | 492/32 |
| 3,599,304 | A | * | 8/1971 | Senior | 492/32 |
| 3,633,246 | A | * | 1/1972 | Kirkpatrick | 24/19 |
| 3,668,752 | A | * | 6/1972 | Clifton et al. | 492/8 |
| 3,739,675 | A | * | 6/1973 | Duckett et al. | 83/659 |
| 3,765,329 | A | * | 10/1973 | Kirkpatrick et al. | 101/415.1 |
| 3,775,821 | A | * | 12/1973 | Somerville | 198/722 |
| 4,005,653 | A | * | 2/1977 | Arkell | 101/389.1 |
| 4,029,013 | A | * | 6/1977 | George et al. | 101/389.1 |
| 4,031,600 | A | * | 6/1977 | Whigham | 492/48 |
| 4,110,882 | A | * | 9/1978 | Hodge et al. | 492/48 |
| 4,116,594 | A | * | 9/1978 | Leanna et al. | 425/3 |
| 4,193,178 | A | * | 3/1980 | McArthur et al. | 492/49 |
| 4,561,156 | A | * | 12/1985 | Sun | 241/294 |
| 4,627,144 | A | * | 12/1986 | Burke | 29/447 |
| 4,650,454 | A | * | 3/1987 | Moll | 493/442 |
| 4,720,207 | A | * | 1/1988 | Salani | 404/90 |
| 4,934,899 | A | * | 6/1990 | Patacca | 415/9 |
| 5,253,816 | A | * | 10/1993 | Kastingschafer et al. | 241/227 |
| 5,385,309 | A | * | 1/1995 | Bielagus | 241/235 |
| 5,470,471 | A | * | 11/1995 | Luthi et al. | 210/386 |
| 5,471,859 | A | * | 12/1995 | Sendzimir et al. | 72/241.4 |
| 5,481,895 | A | * | 1/1996 | Sendzimir et al. | 72/242.4 |
| 5,655,717 | A | * | 8/1997 | Chen | 241/2 |
| 5,667,642 | A | * | 9/1997 | Luthi | 162/358.1 |
| 6,135,002 | A | * | 10/2000 | Neal | 83/659 |
| 6,203,666 | B1 | * | 3/2001 | Hanaya | 162/217 |
| 6,280,371 | B1 | * | 8/2001 | Krippelz | 492/39 |
| 6,311,849 | B1 | * | 11/2001 | Sbaschnigg et al. | 210/404 |
| 6,435,069 | B1 | * | 8/2002 | Kirkpatrick et al. | 83/698.42 |
| 6,454,687 | B1 | * | 9/2002 | Mattsson | 492/45 |
| 6,629,482 | B2 | * | 10/2003 | Elia et al. | 83/659 |
| 6,698,326 | B2 | * | 3/2004 | Elia et al. | 83/659 |
| 6,716,017 | B2 | * | 4/2004 | Papadopoulas | 425/194 |
| 6,792,859 | B2 | * | 9/2004 | Fukui et al. | 101/378 |
| 6,820,529 | B2 | * | 11/2004 | Elia et al. | 83/659 |
| 2002/0197346 | A1 | * | 12/2002 | Papadopoulos | 425/194 |
| 2005/0230306 | A1 | | 10/2005 | Sicley | |
| 2005/0236339 | A1 | * | 10/2005 | Grace et al. | 210/784 |

OTHER PUBLICATIONS

Supplementary European Search Report EP07835423 dated May 24, 2012.

* cited by examiner

PRESS ROLL FOR WASHING AND/OR DEWATERING PULP, AND A METHOD FOR MANUFACTURING OR REPAIRING SUCH A PRESS ROLL

FIELD OF THE INVENTION

The present invention relates to a press roll for washing and/or dewatering pulp, comprising an axial core and a mantle section provided around the axial core, to which mantle section at least one perforated roll plate is attached, which roll plate has two short sides and two long sides, and the roll plate extends around the entire circumference of the press roll. More particularly, the present invention also relates to a method for manufacturing or repairing a press roll for washing and/or dewatering pulp, the press roll comprising an axial core and a mantle section provided around the axial core, to which mantle section at least one perforated roll plate is intended to be attached. Still more particularly, the present invention relates to a roll press comprising the above-mentioned type of press roll.

BACKGROUND OF THE INVENTION

When producing cellulose-based products, a roll press is frequently present for washing and dewatering the cellulose-based pulp. The pulp is passed between two cooperating press rolls in the roll press. The press rolls have a perforated outer surface, whereby the outer surface is permeable to liquid pressed out of the pulp. The pulp is pressed in the roll nip or press nip between the press rolls, whereby liquid is pressed out of the pulp. One example of such a roll press for dewatering pulp is disclosed in International Application No. WO 97/21868, e.g., where the central axes of the press rolls lie in substantially the same horizontal plane, and the pulp passes the press nip between the press rolls in a vertical direction, from below upwards.

International Application No. WO 03/018907 describes sealing of a press roll in a roll press having two cooperating press rolls for dewatering material suspensions.

The above-mentioned press rolls have in common that their roll bodies have a conventional structure, where the roll body comprises an axial core, such as a central drum, which can comprise a drum or an inner drum covered with a covering plate, or the like. The central drum is provided with several supporting ribs arranged longitudinally along the longitudinal extension of the central drum and evenly distributed around the circumference of the central drum. The purpose of these supporting ribs is to strengthen the structure, and also to provide channels which axially guide liquid pressed out of the pulp to the ends of the press roll. A mantle section is attached onto these supporting ribs, which mantle section comprises several circumferential frame rings arranged along the entire length of the roll body. The purpose of the frame rings is to be a supporting structure for the perforated roll plates which are positioned on the press roll, which roll plates are shrunk onto and abut the frame rings around their entire circumference, and also to allow expressed liquid, which has passed through the roll plate, to fall downwards after passage through the apertures of the roll plate. In this manner, rewetting is reduced, i.e. the liquid which, after the press nip, flows back through the roll plate and dilutes the pressed pulp, especially for roll presses where the pulp is passed through the press nip between two press rolls in a vertical direction from below upwards, such as in International Application No. WO 97/21868.

In a conventional manner, the roll plates are shrunk onto and around the mantle section. In a heated condition, the roll plates are placed around the mantle section, and subsequently, the heated roll plates are cooled down, whereby the roll plate contracts and obtains a tight abutment against the mantle section along the entire circumference. When manufacturing and repairing press rolls in a conventional manner, the short sides of the roll plate, which form a transverse joint, have been joined by welding so that a tube structure is formed, which tube structure in a heated condition is slipped onto the mantle section over one of its ends. Alternatively, upon repair of a press roll, when a roll plate is to be exchanged, the short sides can be welded together after the roll plate has been placed onto the mantle section, after which contraction of the roll plate is effected. After this, the long sides of the roll plate are welded, inter alia in order to lock the roll plate to the mantle section, i.e. to prevent movement of the roll plate in relation to the mantle section in the circumferential direction of the press roll. The welding seams are machined so that the roll plates together form an even outer surface.

U.S. Patent Publication No. 2005/0236339 A1 discloses a rotary drum filter having corrugated sheets mounted around the entire circumference of the drum filter, whereby alternating ridges and channels are formed along the longitudinal extension of the drum filter, where the ridges and channels extend along the direction of rotation of the drum filter. The drum filter comprises perforated plates which are attached to the outside of the corrugated sheets by welding the perforated plates to the tops of the ridges of the corrugated sheets. Liquid which has entered through the perforated plates is drained away by means of channels formed by the corrugated sheets.

However, there are problems associated with the welding of the roll plates, especially with regard to the welding of the longitudinal sides of the roll plates, i.e. along the circumference of the press roll. The welding seam along the longitudinal side of a roll plate is subjected to stress during operation, inter alia because of something which appears as wave motions in the roll plate, so called shearing stress, which originates from the press nip between the two press rolls of a roll press, as the one disclosed in International Application No. WO 97/21868, where the pulp is pressed together in the 8 mm press nip. As a result of this stress, the welding seam along the longitudinal side of the roll plate can sometimes crack after a certain period of operation, and this crack, or these cracks, can subsequently continue in the roll plate in an uncontrolled manner, which results in the necessity that the press roll be replaced or repaired, which in turn results in costly stoppage. In the “welding crosses”, where the welding seam of the transverse joint meets the welding seams which extend around the circumference, the risk of cracks is especially high.

U.S. Patent Publication No. 2005/0230306 A1 discloses a way to mount perforated deck segments to the frame rings of the mantle section of a press roll without welding, which deck segments have a leading edge and a trailing edge. The frame rings comprise several longitudinally extending spaced apart grooves which open outwardly. The leading edge of the deck segment is provided with a bar which is adapted to engage in the groove. The same leading edge is provided with a lip adapted to clamp the trailing edge of a deck segment between the mantle section and the leading edge lip. The leading edge of the deck segment is provided with a mounting opening and the bar is provided with an associated mounting opening, and the frame ring is provided with a hole. An attachment pin is inserted into the mounting openings of the deck segment and the bar, and into the associated frame ring hole, and attaches the bar to the mantle section.

One of the objects of the present invention is thus to provide a press roll which is more durable and more reliable in operation compared to prior art press rolls, and which avoids the above-mentioned cracks in the roll plate.

SUMMARY OF THE INVENTION

In accordance with the present invention, this and other objects have now been realized by the invention of a press roll for washing or dewatering pulp comprising an axially-extending core, a mantle section attached around the axially-extending core, at least one perforated roll plate attached to the mantle section and extending around the entire circumference of the press roll so that the at least one perforated roll plate includes a pair of circumferentially-extending edges and a pair of end edges, the at least one perforated roll plate comprising a plurality of mounting openings disposed between the pair of end edges and distributed around the entire circumference of the press roll, and a plurality of fixing pins corresponding to the plurality of mounting openings, each of the plurality of fixing pins being anchored to the mantle section and being surrounded by the corresponding plurality of mounting openings, whereby movement of the at least one perforated roll plate relative to the mantle section in a circumferential direction of the press roll is prevented. In a preferred embodiment, the plurality of mounting openings are centrally disposed between the pair of circumferentially-extending edges of the at least one perforated roll plate. In a preferred embodiment, the plurality of mounting openings are disposed along the longitudinally-extending center line of the at least one perforated roll plate.

In accordance with another embodiment of the press roll of the present invention, the plurality of mounting openings are evenly distributed around the entire circumference of the press roll, whereby the distance between each adjacent one of the plurality of mounting openings is substantially the same.

In accordance with another embodiment of the press roll of the present invention, the plurality of mounting openings comprises at least three mounting openings.

In accordance with another embodiment of the press roll of the present invention, the mantle section includes a plurality of attachment holes corresponding to the plurality of mounting openings, each of the plurality of fixing pins including a fixing portion for anchoring in the corresponding plurality of attachment holes. In a preferred embodiment, the fixing portion comprises threads. In another embodiment, the press roll includes a plurality of support ribs for attaching the mantle section to the axially-extending core, the plurality of support ribs extending substantially radially from the axially-extending core and distributed around the circumference of the axially-extending core, each of the plurality of mounting openings and its corresponding plurality of attachment holes being in radially alignment with one of the plurality of support ribs.

In accordance with another embodiment of the press roll of the present invention, each of the plurality of mounting openings includes an inner surface having a size whereby a gap is provided between the inner surface of the plurality of mounting openings and the corresponding plurality of fixing pins.

In accordance with the present invention, a roll press is also provided for washing or dewatering pulp comprising a pair of press rolls defining a nip therebetween whereby pulp can be pressed in the nip, at least one of the pair of press rolls comprising the press roll discussed above.

In accordance with the present invention, a method has also been invented for providing a press roll for washing or dewatering pulp, the press roll comprising an axially-extending core, and a mantle section attached around the axially-extending core, the method comprising attaching at least one perforated roll plate to the mantle section so that it extends around the entire circumference of the press roll, whereby the at least one perforated roll plate includes a pair of circumferentially-extending edges and a pair of end edges, drilling a plurality of mounting openings between the pair of end edges and distributed around the entire circumference of the press roll, inserting a plurality of fixing pins into each of the plurality of mounting openings, and anchoring each of the plurality of fixing pins in the mantle section, whereby the plurality of fixing pins are surrounded by the corresponding plurality of mounting openings, and movement of the at least one perforated roll plate relative to the mantle section in the circumferential direction of the press roll is prevented. In a preferred embodiment, attaching of the at least one perforated roll plate comprises providing the at least one perforated roll plate around the mantle section and contracting the at least one perforated roll plate thereabout.

In accordance with another embodiment of the method of the present invention, the drilling of the plurality of mounting openings comprises drilling at positions centrally between the pair of circumferentially-extending edges of the at least one perforated roll plate. In a preferred embodiment, the drilling of the plurality of mounting openings comprises drilling at positions along the longitudinal center line of the at least one perforated roll plate.

In accordance with another embodiment of the method of the present invention, drilling of the plurality of mounting openings comprises evenly distributing the plurality of mounting openings around the entire circumference of the press roll, whereby the distance between each adjacent one of the plurality of mounting openings is substantially the same.

In accordance with another embodiment of the method of the present invention, the plurality of mounting openings comprises at least three mounting openings, and the anchoring of each of the plurality of fixing pins comprises inserting the plurality of fixing pins into the at least three mounting openings thereby anchoring the plurality of fixing pins in the mantle section.

In accordance with another embodiment of the method of the present invention, the method includes drilling a plurality of attachment holes corresponding to each of the plurality of mounting openings in the mantle section following the drilling of the plurality of mounting openings, and wherein each of the plurality of fixing pins includes a fixing portion, and including anchoring the fixing portion in each of the plurality of attachment holes. In a preferred embodiment, the fixing portion comprises at least one threaded portion. In another embodiment, the method includes providing a plurality of support ribs for attaching the mantle section to the axially-extending core, and mounting the plurality of support ribs substantially radially from the axially-extending core and distributed around the circumference of the axially-extending core, each of the plurality of mounting openings and its corresponding attachment hole being in radial alignment with one of the plurality of support ribs.

In accordance with another embodiment of the method of the present invention, each of the plurality of mounting openings includes an inner surface, and the method includes drilling each of the plurality of mounting openings so as to provide a gap between the plurality of fixing pins and the inner surface of the plurality of mounting openings.

In accordance with the present invention, a press roll is obtained where the risk of cracks in the roll plate is radically reduced, because of the replacement of the welding seams along the long sides of the roll plate by the innovative mounting openings and attachment pins, which provide a locking of the roll plate to the mantle section, i.e. movement of the roll plate in relation to the mantle section in the circumferential direction of the press roll is prevented, without any welding of the long sides of the roll plate. In this manner, stoppage as a result of broken roll plates, which must then be replaced, is prevented. By means of the present invention it is also easier to change worn or damaged roll plates, as the roll plate to be replaced does not need to be released from any welding seams at its long sides. The manufacturing of the press roll is also facilitated, because subsequent grinding of the weld reinforcement, as a result of the welding of the long sides of the roll plate, is not needed. The present invention is especially advantageous for press rolls where the roll plate extends around the entire circumference of the press roll.

According to an advantageous embodiment of the present invention, the roll plate is provided with at least three mounting openings, into which fixing pins are received. For larger press rolls, it is advantageous with six mounting openings into which fixing pins are received, but other numbers of mounting openings are possible. Advantageously, the mounting openings are evenly distributed around the entire circumference of the press roll so that the distance between two mounting openings, which are adjacent to each other in the circumferential direction of the press roll, is substantially equal around the entire circumference of the press roll. In the case of three mounting openings, two mounting openings, which are adjacent to each other in the circumferential direction of the press roll, are spaced apart by about 120° in the cross section of the roll press, and in the case of six mounting openings, two mounting openings, which are adjacent to each other in the circumferential direction of the press roll, are spaced apart by about 60° in the cross section of the roll press. The fact that the distances between the mounting openings are equal facilitates drilling of the holes.

According to a further advantageous embodiment of the present invention, the mounting openings are centrally positioned between the long sides of the roll plate, and advantageously along the longitudinal center line of the roll plate. In this manner, symmetry in the structure is provided, which is advantageous. Alternatively, three mounting openings can for example be provided along the first long side of the roll plate and three additional mounting openings can be provided along the second long side of the roll plate, opposite the mounting openings at the first long side, whereby the desired symmetry in the structure is also obtained.

According to other advantageous embodiments of the present invention, each fixing pin is provided with a fixing portion, an attachment hole for each mounting opening is provided in the mantle section, and the fixing portion is anchored in this attachment hole. Advantageously, the fixing portion of the fixing pin is provided with at least one thread, and the fixing pin is driven into the attachment hole through the associated mounting opening. In this manner, firm engagement between the fixing pin and the attachment hole is obtained. Alternatively, the attachment hole can be provided with at least one internal thread, and the fixing pin can be screwed into the attachment hole and engage the internal thread of the attachment hole. The mounting opening can also be provided with at least one internal thread adapted to engage the at least one thread of the fixing pin. For example, a ragged fixing portion can be an alternative to a threaded fixing portion, whereby the fixing pin is driven into the attachment hole. Instead of anchoring the fixing pin in this attachment hole, the fixing pin can be anchored in an attachment member included in the mantle section, provided inside the mantle section, for example by way of threaded engagement, whereby the attachment hole is a through-hole.

BRIEF DESCRIPTION OF THE DRAWINGS

The present invention will now be described, for exemplary purposes, in more detail by way of embodiments and with reference to the following detailed description which, in turn, refers to the drawings, in which.

DETAILED DESCRIPTION

Figure 1:
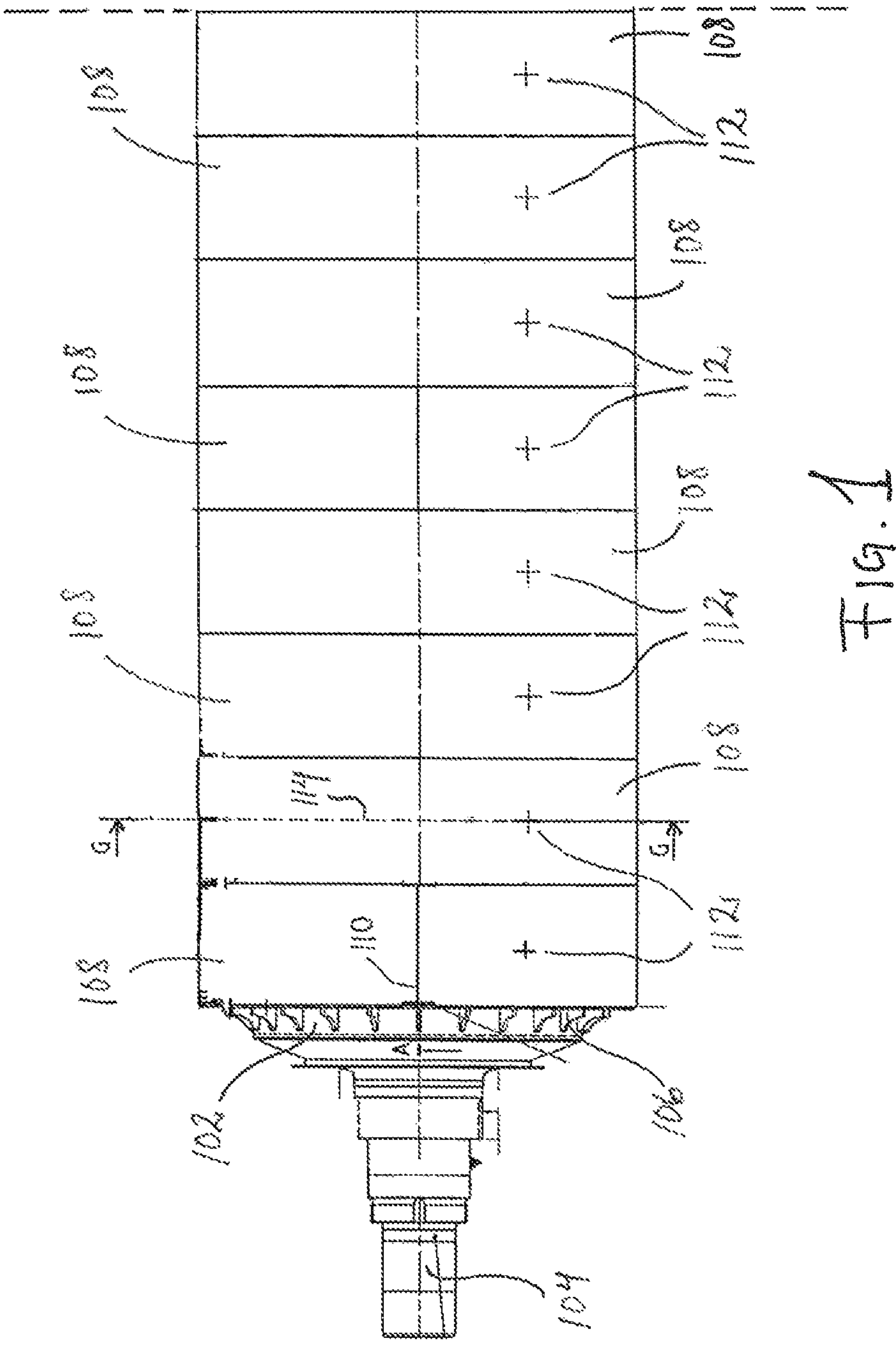
FIG. 1 is a front, elevational schematic view of one half of an embodiment of the press roll according to the present invention.

FIG. 1 shows only one half of a press roll according to the present invention, where the other half is a mirror image of the shown half. The press roll comprises an axial core 102 in the form of a central drum 102, to the outer ends of which attachment means 104 are attached for pivotally mounting the press roll in a roll press. Several supporting ribs 106, which extend along the longitudinal extension of the axial core 102 and extend in a substantially radial direction, are welded to the outer surface of the central drum 102. The supporting ribs 106 are distributed around the circumference of the central drum 102. The mantle section is shrunk onto these supporting ribs 106 in a conventional manner. Sixteen perforated roll plates 108 are attached to the mantle section, of which only eight are shown in the figure, and each roll plate 108 extends around the entire circumference of the press roll. The short sides of each roll plate 108, which meet in a transverse joint 110, have been welded to each other, after which the roll plate 108 has been slipped onto the mantle section and shrunk into position by cooling, so that it abuts against the mantle section. In this embodiment, each roll plate 108 comprises three mounting openings 112, where the position of only one mounting opening 112 per roll plate 108 is shown in the figure. The mounting openings 112 are distributed between the two short sides of the roll plate 108 along the longitudinal extension of the roll plate 108 and the circumference of the press roll. As shown in the figure, the mounting openings 112 are located along the longitudinal centre line 114 of the roll plate 108.

Figure 2:
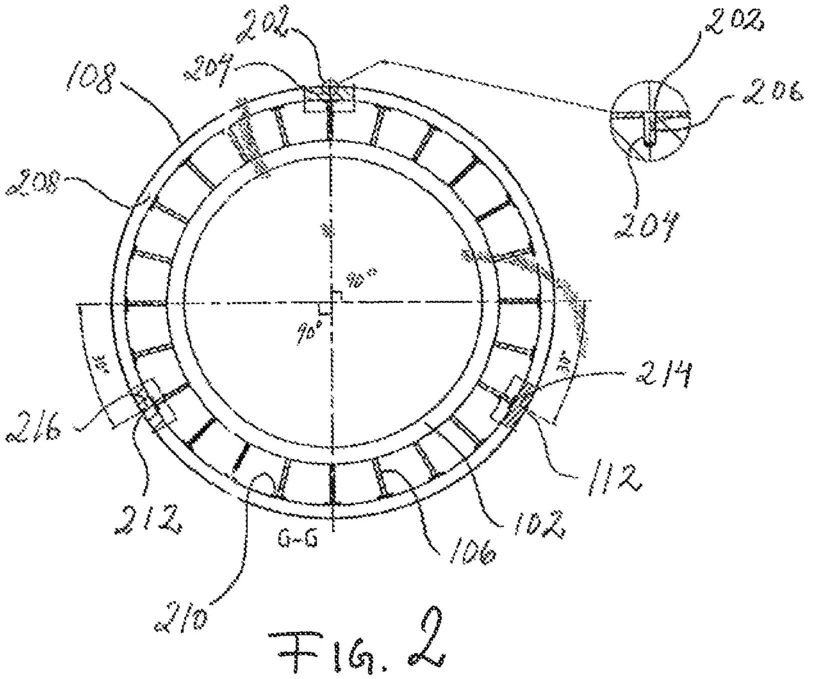
FIG. 2 is a cross-sectional view of the press roll of FIG. 1 along the line G-G.

FIG. 2 shows a section of the press roll of FIG. 1 along line G-G, and an enlarged view of a mounting opening 202 with an associated attachment hole 204 and fixing pin 206. Here, the mantle section of the press roll is more clearly shown. The mantle section comprises several frame rings 208 distributed along the length of the central drum 102 and several flat bars 210 which extend along the longitudinal extension of the central drum 102 and are distributed around the circumference of the press roll. The frame rings 208 are attached to the supporting ribs 106 by way of the flat bars 210. The roll plates 108 abut against the frame rings 208. The roll plate 108 comprises three drilled mounting openings, 112, 202 and 212, and the mantle section comprises three attachment holes, 204, 214 and 216, which are drilled in one frame ring 208. Each attachment hole, 204, 214 and 216, extends along the same radius along which each mounting opening, 112, 202 and 212, extends, whereby each attachment hole 204, 214 and 216, is radially aligned with its mounting opening 112, 202, 212. A fixing pin 206 is received in each mounting opening 112, 202 and 212, and attachment hole 204, 214 and 216, which fixing pin 206 is anchored in the frame ring 208 and is surrounded by the inner surface of its mounting opening, 112, 202 and 212, whereby a locking of the roll plate 108 to the mantle section is obtained. Each mounting opening 112, 202 and 212, and its attachment hole 204, 214 and 216, are radially aligned with a supporting rib 106, which provides an effective rigidity when drilling the mounting openings 112, 202 and 212, and attachment holes 204, 214 and 216. The pairs of mounting openings 112, 202 and 212, and the attachment holes 204, 214 and 216, are evenly distributed around the entire circumference of the press roll so that the distance between two mounting openings 112, 202 and 212, which are adjacent to each other in the circumferential direction of the press roll, is substantially equal around the entire circumference of the press roll. Here, two mounting openings, 112, 202 and 212, which are adjacent to each other in the circumferential direction of the press roll, are spaced apart by about 120° in the cross-section of the roll press. Here, each attachment hole has a smaller diameter than each mounting opening. The surfaces of the roll plate, where each mounting opening 112, 202 and 212, is provided, have no perforation.

Figure 3:
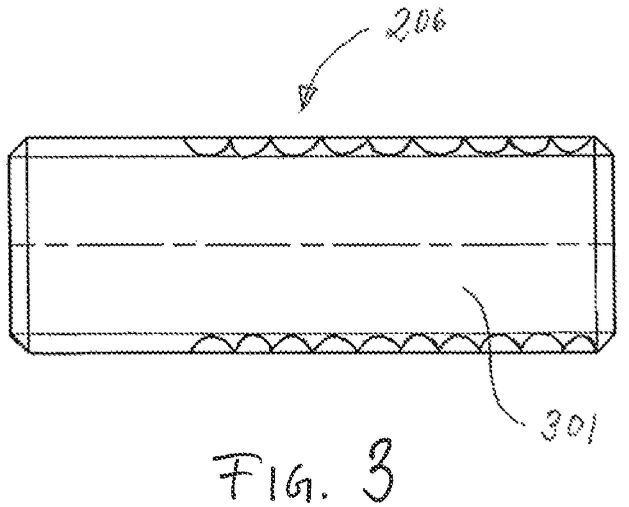
FIG. 3 is a side, elevational schematic view of an embodiment of the fixing pin according to the present invention.

FIG. 3 shows a section of an embodiment of the fixing pin 206 according to the present invention, having a diameter which is a bit larger than the diameter of the attachment hole. The fixing pin 206 is made from the alloy 254Smo and is provided with a fixing portion 301 for anchorage in an attachment hole, the fixing portion 301 being provided with at least one thread. The threaded fixing portion 301 is driven into an attachment hole through the associated mounting opening as described in connection with FIG. 4. The diameter of the fixing pin 206 is smaller than the diameter of the mounting opening, whereby a gap is provided between the fixing pin 206 and the inner surface of its mounting opening, and potential damage to the roll plate when driving the fixing pin 206 is avoided. Further advantages with this gap are disclosed in connection with FIG. 4.

Figure 4:
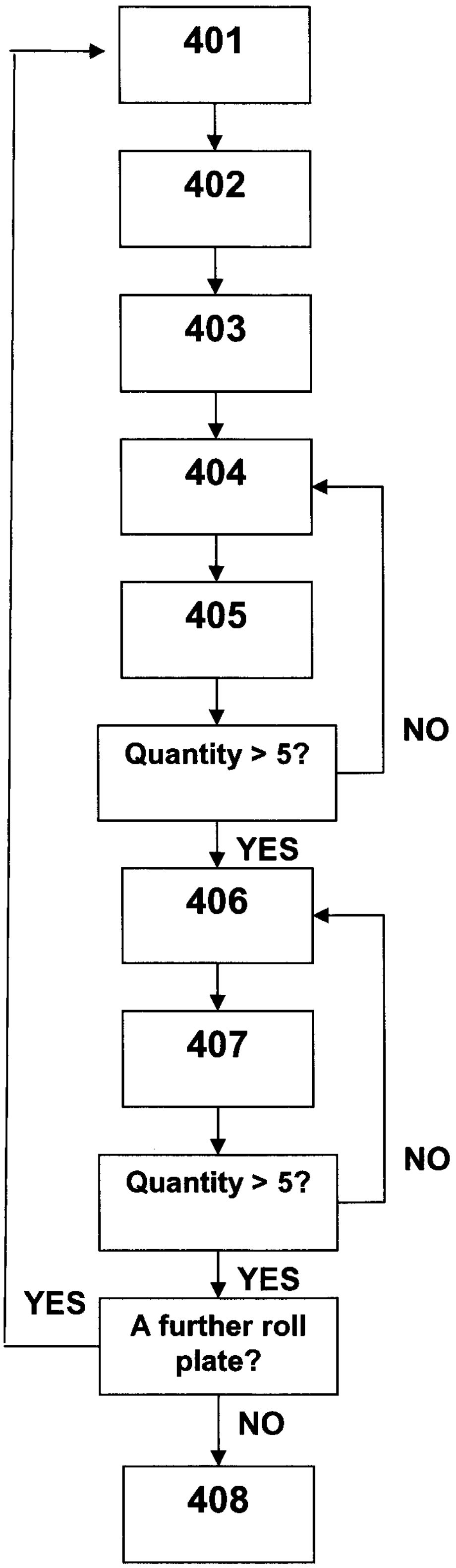
FIG. 4 is a flow chart which schematically illustrates an embodiment of the method according to the present invention.

FIG. 4 shows a flow chart illustrating an embodiment of the method when manufacturing a press roll for washing and/or dewatering pulp according to the present invention, where the press roll comprises an axial core and a mantle section provided around the axial core, to which mantle section several perforated roll plates are intended to be attached, which method comprises the following steps: A roll plate is heated to about 250 to 300° C., at 401, so it thermally expands and, inter alia, is lengthened, and is placed around the frame rings of the mantle section, at 402, so that the long sides of the roll plate extend along the entire circumference of the press roll. The heated roll plate, which surrounds the mantle section, is now "hanging down" on the underside of the press roll. The roll plate is cooled, at 403, whereby the roll plate, which is provided onto the mantle section, is shrunk into firm engagement with and around the frame rings of the mantle section, and a so called "shrink fit" is attained. In the same step, at 404, a first mounting opening is drilled in the roll plate, between the two short sides of the roll plate along the longitudinal center line of the roll plate, and a first attachment hole is drilled in a frame ring of the mantle section. This drilling is performed by a drill having two different diameters, so that the attachment hole obtains a smaller diameter than the diameter of the mounting opening. The drilling is performed so that the mounting opening and the associated attachment hole are radially aligned with a supporting rib attached to the axial core of the press roll. Subsequently, the press roll is rotated about 60° in relation to the drill, at 405, and the drilling step is repeated, at 404, so that a second mounting opening is provided in the roll plate and as second attachment hole is provided in the frame ring of the mantle section. Said rotation, 405, and drilling, 404, are repeated until the number of mounting openings and attachment holes drilled, respectively, is six. In this manner, the mounting openings are evenly distributed around the entire circumference of the press roll so that the distance between two mounting openings, which are adjacent to each other in the circumferential direction of the press roll, is substantially equal around the entire circumference of the press roll.

A first fixing pin is provided with a fixing portion, at 406, comprising at least one thread, and the first fixing pin is driven into the first attachment hole, at 407, through the first mounting opening, whereby an effective anchoring of the fixing pin is attained. Subsequently, a second fixing pin is provided with a fixing portion, at 406, comprising at least one thread, and is driven into the second attachment hole, at 407, through the first mounting opening, in the same manner. This is repeated until the number of driven fixing pin is six, and all six pairs of mounting openings and attachment holes are provided with a fixing pin. Additionally, each fixing pin has been given such a longitudinal extension in relation to each attachment hole and mounting opening that the fixing pin is surrounded by the inner surface of the mounting opening without rising above the outer surface of the roll plate. Further, the diameter of every fixing pin is smaller than the diameter of its mounting opening, whereby a gap is provided between the fixing pin and the inner surface of its mounting surface. This gap enables a visual inspection to see if the roll plate has been dislocated during the assembly and/or during operation. The gap also provides for a play which is advantageous since the roll plate expands and contracts. If a further roll plate is to be mounted, the steps 401 to 407 are repeated, and when all roll plates are mounted, the press roll can be mounted in a roll press, at 408. When repairing a press roll, because one of the roll plates is damaged, the damaged roll plate is removed, after which the steps 401 to 407 are performed as mentioned above.

Figure 5:
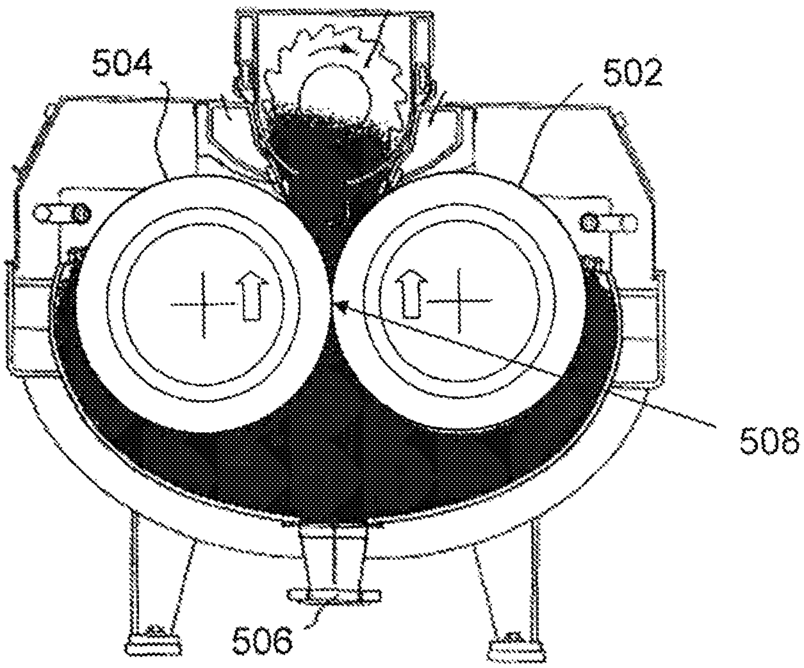
FIG. 5 is a side, elevational, schematic, partially cut-away view of an embodiment of the roll press according to the present invention.

FIG. 5 shows an embodiment of the roll press for washing and/or dewatering pulp according to the present invention, comprising a first press roll 502 and a second roll press 504 of the kind shown in FIG. 1. The longitudinal central axes of the press rolls, 502 and 504, lie in substantially the same horizontal plane. The pulp is received through an inlet 506 and is pushed up towards the press nip 408 between the first and second press rolls, 502 and 504. The direction of rotation of each press roll 502, 504 is illustrated by way of vertical arrows in the figure. The pulp passes the press nip 508 in a vertical direction, from below upwards, where the pulp is dewatered and is pushed further up in a vertical direction. Other embodiments of the roll press according to the present invention are also possible. The longitudinal central axes of the press rolls can for example lie in substantially the same vertical plane, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A press roll for washing or dewatering pulp comprising an axially-extending core, a mantle section attached around said axially-extending core, a plurality of adjacent perforated roll plates disposed around said mantle section and contracted thereonto, each of said plurality of perforated roll plates extending around the entire circumference of said press roll so that each of said plurality of perforated roll plates includes a pair of circumferentially-extending edges and a pair of end edges that have been joined by welding, each of said plurality of perforated roll plates comprising a plurality of mounting openings disposed between said pair of end edges and distributed around the entire circumference of said press roll, and a plurality of fixing pins corresponding to said plurality of mounting openings, each of said plurality of fixing pins being anchored to said mantle section and being surrounded by said corresponding plurality of mounting openings, whereby movement of each of said plurality of perforated roll plates relative to said mantle section in a welded circumferential direction of said press roll is prevented.

2. The press roll of claim 1, wherein said plurality of mounting openings are centrally disposed between said pair of circumferentially-extending edges of each of said plurality of perforated roll plates.

3. The press roll of claim 2, wherein said plurality of mounting openings are disposed along the longitudinally-extending center line of each of said plurality of perforated roll plates.

4. The press roll of claim 1, wherein said plurality of mounting openings are evenly distributed around said entire circumference of said press roll, whereby the distance between each adjacent one of said plurality of mounting openings is substantially the same.

5. The press roll of claim 1, wherein said plurality of mounting openings comprises at least three mounting openings.

6. The press roll of claim 1, wherein said mantle section includes a plurality of attachment holes corresponding to said plurality of mounting openings, each of said plurality of fixing pins including a fixing portion for anchoring in said corresponding plurality of attachment holes.

7. The press roll of claim 6, wherein said fixing portion comprises threads.

8. The press roll of claim 6, including a plurality of support ribs for attaching said mantle section to said axially-extending core, said plurality of support ribs extending substantially radially from said axially-extending core and distributed around the circumference of said axially-extending core, each of said plurality of mounting openings and its corresponding plurality of attachment holes being in radially alignment with one of said plurality of support ribs.

9. The press roll of claim 1, wherein each of said plurality of mounting openings includes an inner surface having a size whereby a gap is provided between said inner surface of said plurality of mounting openings and said corresponding plurality of fixing pins.

10. A roll press for washing or dewatering pulp comprising a pair of press rolls defining a nip therebetween whereby pulp can be pressed in said nip, at least one of said pair of press rolls comprising the press roll of claim 1.

11. A method for providing a press roll for washing or dewatering pulp, said press roll comprising an axially-extending core, and a mantle section attached around said axially-extending core, said method comprising contracting at least one perforated roll plate by cooling to said mantle section so that it extends around the entire circumference of said press roll, whereby said at least one perforated roll plate includes a pair of circumferentially-extending edges and a pair of end edges that have been joined by welding, drilling a plurality of mounting openings between said pair of end edges and distributed around the entire circumference of said press roll, inserting a plurality of fixing pins into each of said plurality of mounting openings, and anchoring each of said plurality of fixing pins in said mantle section, whereby said plurality of fixing pins are surrounded by said corresponding plurality of mounting openings, and movement of said at least one perforated roll plate relative to said mantle section in said circumferential direction of said press roll is prevented.

12. The method of claim 11, wherein said attaching of said at least one perforated roll plate comprises providing said at least one perforated roll plate around said mantle section and contracting said at least one perforated roll plate thereabout.

13. The method of claim 11, wherein said drilling of said plurality of mounting openings comprises drilling at positions centrally between said pair of circumferentially-extending edges of said at least one perforated roll plate.

14. The method of claim 13, wherein said drilling of said plurality of mounting openings comprises drilling at positions along the longitudinal center line of said at least one perforated roll plate.

15. The method of claim 11, wherein said drilling of said plurality of mounting openings comprises evenly distributing said plurality of mounting openings around the entire circumference of said press roll, whereby the distance between each adjacent one of said plurality of mounting openings is substantially the same.

16. The method of claim 11, wherein said plurality of mounting openings comprises at least three mounting openings, and wherein said anchoring of each of said plurality of fixing pins comprises inserting said plurality of fixing pins into said at least three mounting openings thereby anchoring said plurality of fixing pins in said mantle section.

17. The method of claim 11, including drilling a plurality of attachment holes corresponding to each of said plurality of mounting openings in said mantle section following said drilling of said plurality of mounting openings, and wherein each of said plurality of fixing pins includes a fixing portion, and including anchoring said fixing portion of each of said plurality of fixing pins in each of said plurality of attachment holes.

18. The method of claim 17, wherein said fixing portion in each of said plurality of fixing pins comprises at least one threaded portion.

19. The method of claim 17, including providing a plurality of support ribs for attaching said mantle section to said axially-extending core, and mounting said plurality of support ribs substantially radially from said axially-extending core and distributed around the circumference of said axially-extending core, each of said plurality of mounting openings and its corresponding attachment hole being in radial alignment with one of said plurality of support ribs.

20. The method of claim 11, wherein each of said plurality of mounting openings includes an inner surface, and including drilling each of said plurality of mounting openings so as to provide a gap between said plurality of fixing pins and said inner surface of said plurality of mounting openings.

* * * * *